(12) United States Patent
Hunt et al.

(10) Patent No.: US 6,843,238 B2
(45) Date of Patent: Jan. 18, 2005

(54) COLD START FUEL CONTROL SYSTEM

(75) Inventors: Frank Warren Hunt, West Bloomfield, MI (US); Shigeru Oho, Farmington Hills, MI (US); Ayumu Miyajima, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 10/094,188

(22) Filed: Mar. 8, 2002

(65) Prior Publication Data

US 2003/0168033 A1 Sep. 11, 2003

(51) Int. Cl.[7] .............................. F02M 23/00
(52) U.S. Cl. .................... 123/531; 123/197.17
(58) Field of Search ....................... 123/531, 533, 123/179.15, 179.17, 557, 543, 585, 588, 590, 179.21

(56) References Cited

U.S. PATENT DOCUMENTS

| | | | |
|---|---|---|---|
| 5,119,794 A | 6/1992 | Kushida et al. | 123/549 |
| 5,465,701 A | 11/1995 | Hunt | 123/531 |
| 5,482,023 A | 1/1996 | Hunt et al. | 123/491 |
| 5,529,035 A | 6/1996 | Hunt et al. | 123/179.15 |
| 5,586,539 A | 12/1996 | Yonekawa et al. | 123/458 |
| 5,598,826 A | 2/1997 | Hunt et al. | 123/491 |
| 5,850,822 A | 12/1998 | Romann et al. | 123/549 |
| 5,873,354 A | 2/1999 | Krohn et al. | 123/549 |
| 5,894,832 A | 4/1999 | Nogi et al. | 123/491 |
| 5,934,260 A | 8/1999 | Gadkaree et al. | 123/520 |
| 6,058,915 A | 5/2000 | Abidin et al. | 123/546 |
| 6,109,247 A | 8/2000 | Hunt | 123/549 |
| 6,279,549 B1 | 8/2001 | Hunt et al. | 123/549 |
| 6,334,418 B1 | 1/2002 | Hubbard | 123/179.21 |

FOREIGN PATENT DOCUMENTS

| | | |
|---|---|---|
| DE | 197 49 471 | 5/1999 |
| DE | 101 15 442 | 10/2001 |
| DE | 101 15 282 | 11/2001 |
| GB | 966 012 | 8/1964 |

*Primary Examiner*—Carl S. Miller
(74) *Attorney, Agent, or Firm*—Gifford, Krass, Groh, Sprinkle, Anderson & Citkowski, P.C.

(57) ABSTRACT

A cold start fuel control system is disclosed for use with an internal combustion engine having at least one combustion chamber, a source of fuel and a primary intake manifold having an inlet and an outlet and fluidly connected between the fuel source and the combustion chamber. The system includes a cold start fuel injector assembly having an inlet and an outlet with the inlet being fluidly connected to the fuel source. An auxiliary intake manifold has an interior chamber which is fluidly connected with each combustion chamber. The outlet from the cold start fuel injector is then fluidly connected to the auxiliary intake manifold so that, upon activation of the cold start fuel injector assembly, a fuel/air is inducted from the cold start fuel injector, through the auxiliary intake manifold and into the engine combustion chambers. Optionally, the cold start fuel injector assembly as well as the auxiliary intake manifold is heated to enhance the vaporization of the fuel prior to induction into the combustion chambers.

31 Claims, 8 Drawing Sheets

COLD START FUEL CONTROL SYSTEM

BACKGROUND OF THE INVENTION

I. Field of the Invention

The present invention relates to a cold start fuel control system for an internal combustion engine.

II. Description of Related Art

Most modern day internal combustion engines of the type used in automotive vehicles include a plurality of internal combustion chambers. A primary intake manifold has one end open to ambient air and its other end open to the combustion chambers via the engine intake valves. During a warm engine condition, a multipoint fuel injector is associated with each of the internal combustion chambers and provides fuel to the internal combustion chambers. The activation of the fuel injectors is typically controlled by an electronic control unit.

During a cold start engine condition, however, a single cold start fuel injector is oftentimes used to provide fuel to the air intake of the primary manifold to the engine in lieu of the main fuel injectors. The cold start fuel injector injects a sufficient fuel/air mixture into the intake of the primary intake manifold to provide fuel for the engine combustion chambers during an engine warm up period. As the engine warms up, the cold start fuel injector is gradually deactivated while, simultaneously, the multipoint fuel injectors are gradually activated in order to provide a smooth transition between a cold engine condition and a warm engine condition.

In order to ensure engine start up during a cold engine condition, these previously known cold start fuel control systems typically inject sufficient fuel to the engine to achieve a rich fuel/air mixture typically having a ratio in the range of 1:10 to 1:14. While such a rich fuel/air mixture is sufficient to ensure proper starting of the engine during a cold engine condition, it disadvantageously results in undesirable hydrocarbon and nitrous oxide emissions.

In an effort to minimize or at least reduce such undesirable emissions, many previously known cold start fuel control systems have utilized heaters to vaporize the fuel prior to the induction of the fuel/air mixture into the inlet end of the primary intake manifold. However, since the fuel/air mixture from the cold start fuel injector must pass entirely through the primary intake manifold of the engine, fuel condensation can occur within the intake manifold during a cold engine condition. Such fuel condensation adversely affects the fuel efficiency of the engine.

Furthermore, with these previously known cold start fuel control systems, since the fuel/air mixture from the cold start fuel injector must travel entirely through the relatively large volume primary intake manifold before the fuel/air mixture reaches the internal combustion chambers, an appreciable time delay occurs between the activation of the cold start fuel injector and the time that the fuel/air mixture reaches the engine combustion chambers. This time delay necessitates excessive engine cranking and also results in slow engine starting.

SUMMARY OF THE PRESENT INVENTION

The present invention provides a cold start fuel control system which overcomes all of the above-mentioned disadvantages of the previously known systems.

In brief, the cold start fuel control system of the present invention is used in conjunction with an internal combustion engine having at least one, and typically several, combustion chambers. A primary intake manifold has an inlet end and an outlet end and has its outlet end fluidly connected with the engine combustion chambers. The engine further includes a source of fuel which provides fuel to the engine combustion chambers during a warm engine condition through a multipoint fuel injector system.

The cold start fuel control system of the present invention includes at least one cold start fuel injector having an inlet and an outlet. Upon activation, the cold start fuel injector assembly injects fuel towards its outlet.

An auxiliary intake manifold having an interior chamber is attached to the engine such that the interior chamber of the auxiliary intake manifold is fluidly connected with each engine combustion chamber. Preferably, an orifice of a preset size is fluidly disposed in series between the interior of the auxiliary intake manifold and the engine combustion chambers to control the gas flow from the interior of the auxiliary intake manifold and to the engine combustion chambers.

The outlet of the cold start fuel injector assembly is fluidly connected with the interior chamber of the auxiliary intake manifold so that, upon activation of the cold start fuel injector, the fuel/air mixture from the cold start fuel injector is inducted through the auxiliary intake manifold and into the engine combustion chambers. In practice, the internal volume of the auxiliary intake manifold is substantially less than the internal volume of the primary intake manifold of the engine thus providing quicker engine starting than the previously known cold start fuel control systems and further minimizing the possibility of fuel condensation within the auxiliary intake manifold.

In order to ensure complete vaporization of the fuel from the cold start fuel injector prior to the induction of the fuel/air mixture into the engine, the cold start fuel injector assembly preferably includes a heater to enhance vaporization of the fuel. Optionally, the auxiliary intake manifold is also heated which minimizes the possibility of fuel condensation within the auxiliary intake manifold.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
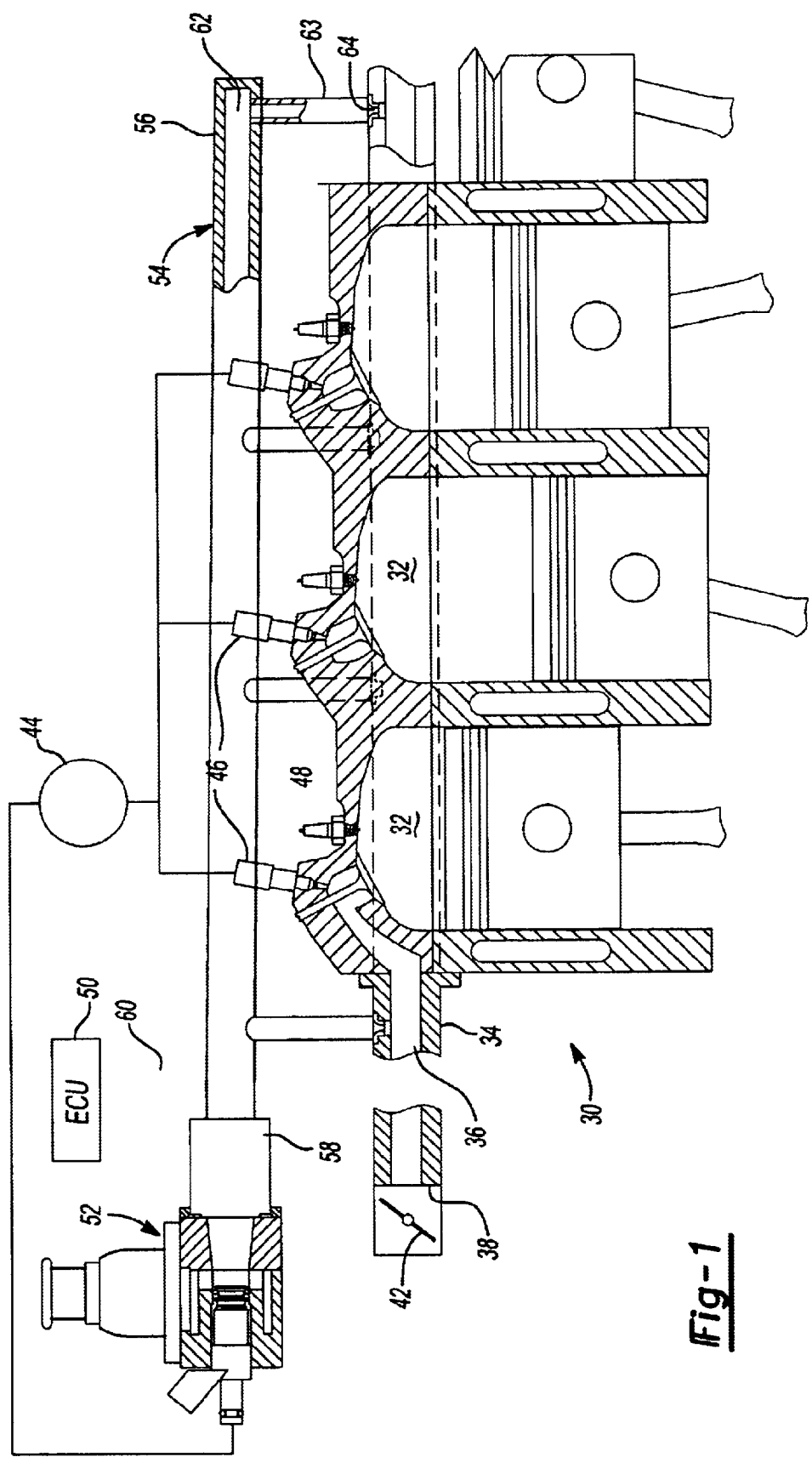
FIG. 1 is a side diagrammatic view illustrating a preferred embodiment of the present invention.
Figure 2:
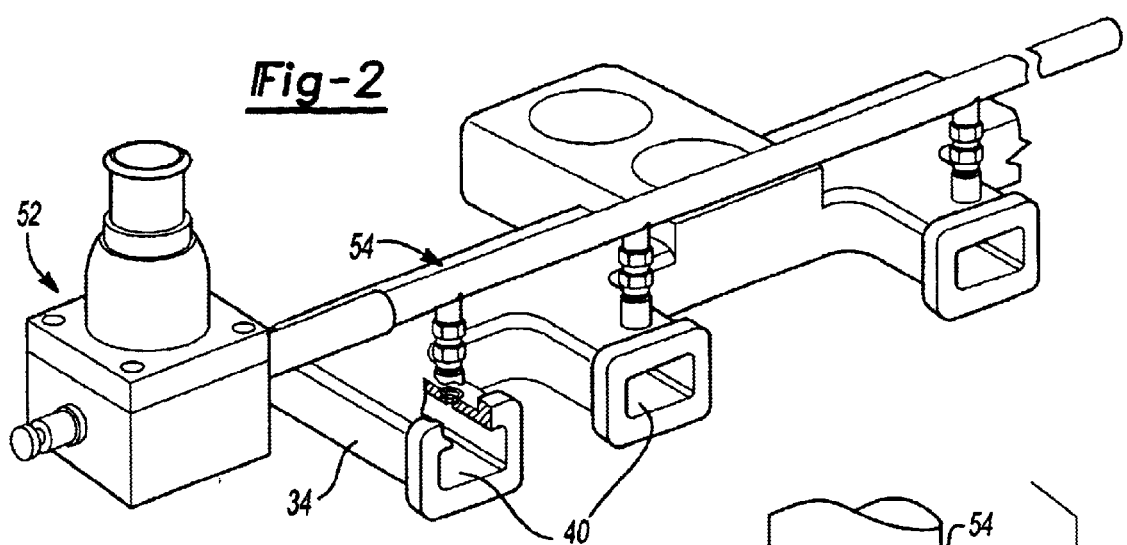
FIG. 2 is an elevational view illustrating a preferred embodiment of the present invention.

With reference now to FIGS. 1 and 2, an internal combustion engine 30 is shown having at least one and more typically several internal combustion chambers 32. These internal combustion chambers 32 are typically arranged in one or two banks of three or four internal combustion chambers 32 per bank.

A primary intake manifold 34 has both an interior chamber 36, an inlet end 38 and an outlet port 40 fluidly connected to each combustion chamber 32. Thus, upon engine cranking, the engine inducts air from the inlet 38 of the primary intake manifold 34, through the primary intake manifold interior chamber 36 and through each outlet port 40 to the combustion chambers 32. A throttle 42 fluidly connected in series with the inlet end 38 of the primary intake manifold 34 controls the air flow volume through the primary intake manifold 34.

The engine 30 further includes a source of fuel 44 (illustrated only diagrammatically) which provides fuel to the engine combustion chambers 32 during a warm engine condition through multipoint fuel injectors 46. One fuel injector 46 is associated with each engine combustion chamber 32 and is typically positioned immediately upstream an intake valve 48 associated with each combustion chamber 32. An engine control unit (ECU) 50, illustrated only diagrammatically, operatively controls the activation of the fuel injectors 46 in the conventional fashion.

With reference now particularly to FIG. 1, the cold start fuel control system of the present invention comprises a cold start fuel injector assembly 52 as well as an auxiliary intake manifold 54. In a fashion which will be subsequently described in greater detail, the cold start fuel injector assembly provides a vaporized fuel/air mixture to the engine combustion chambers 32 through the auxiliary intake manifold 54 during a cold start engine condition.

The auxiliary intake manifold 54 preferably comprises an elongated tube 56 having an inlet end 58 fluidly connected to an outlet 60 of the cold start fuel injector assembly 52. The auxiliary intake manifold includes an interior chamber 62 which is smaller in volume than the volume of the interior chamber 36 of the primary intake manifold 34. Preferably the ratio of the volume of the primary intake manifold 34 to the volume of the auxiliary manifold is 5:1 or greater. Additionally, the interior chamber 62 of the auxiliary intake manifold 34 is fluidly connected by branch pipes 63 and ports 64 to the interior chamber 36 of the primary intake manifold 34 immediately upstream from each of the combustion chambers 32. Consequently, for the four engine combustion chambers 32 illustrated in FIG. 1, a separate port 64 fluidly connects the interior chamber 62 of the auxiliary intake manifold 54 to each engine combustion chamber 32.

Figure 4:
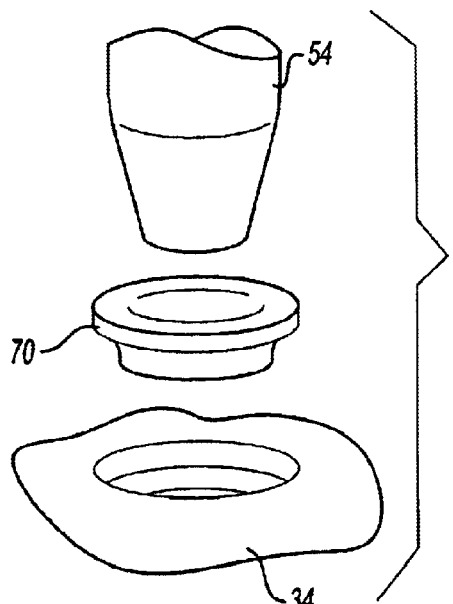
FIG. 4 is an exploded view illustrating a preferred embodiment of the present invention.

With reference now to FIG. 4, in order to accurately control the amount of fuel/air mixture through each port 64, preferably a flow control orifice member 70 is sandwiched in between the branch pipe 63 of the auxiliary intake manifold 54 and the primary intake manifold 34 so that one flow control orifice member 70 is fluidly connected in series with each port 64. Although each control orifice member 70 may be of the same size, optionally, the flow control orifices 70 may be of different sizes to ensure a uniform fuel/air mixture to each engine combustion chamber 32.

Figure 5:
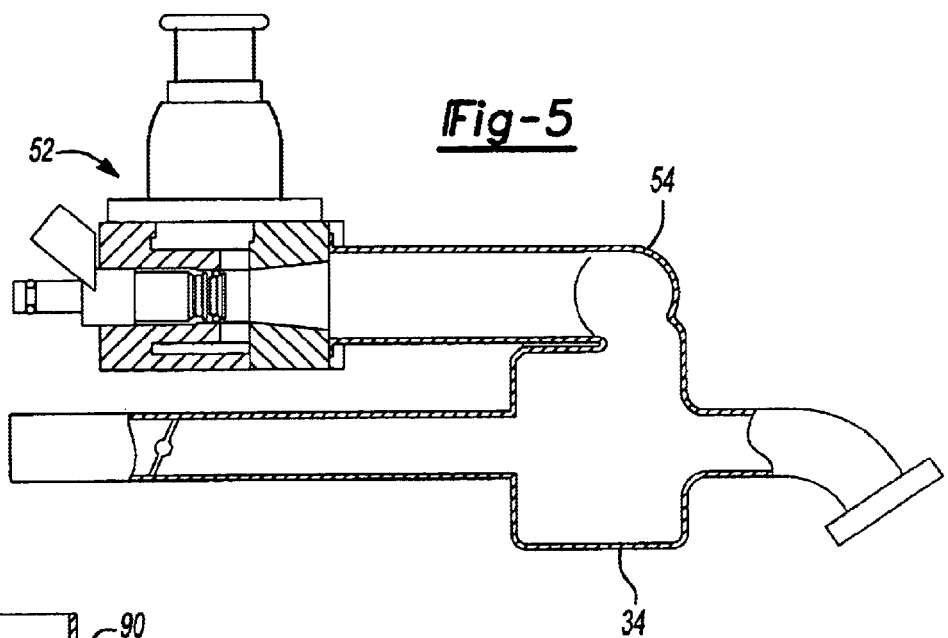
FIG. 5 is a side diagrammatic view illustrating a further preferred embodiment of the present invention.

The auxiliary intake manifold 54 is preferably constructed separately from the primary intake manifold 34 and secured to the primary intake manifold 34 by any conventional means, such as clamps. As shown in FIG. 1, the auxiliary intake manifold preferably slopes downwardly from the cold start fuel injector assembly 52 which provides for improved flow of the fuel/air mixture due to gravity. Optionally, however, as diagrammatically shown in FIG. 5, the primary intake manifold 34 and auxiliary intake manifold 54 may be of a one-piece construction.

With reference again to FIG. 3, one preferred embodiment of the cold start fuel injector assembly 52 is there shown and includes a body 80 and an outlet tube 82 having an outlet end 84. The outlet end 84 is fluidly connected to the interior chamber 62 of the auxiliary intake manifold 54.

A cold start fuel injector 86 is fluidly connected to the source of fuel 44. Furthermore, the cold start fuel injector 86 is mounted to the body 80 such that, upon activation by the ECU 50, the cold start fuel injector 86 injects fuel axially into the outlet tube 82 towards the end 84 of the outlet tube 82.

An air inlet valve 90 is also mounted to the cold start fuel injector body 80 so that air inducted through the air valve 90 intermixes and atomizes fuel injected by the cold start fuel injector 86.

Figure 3:
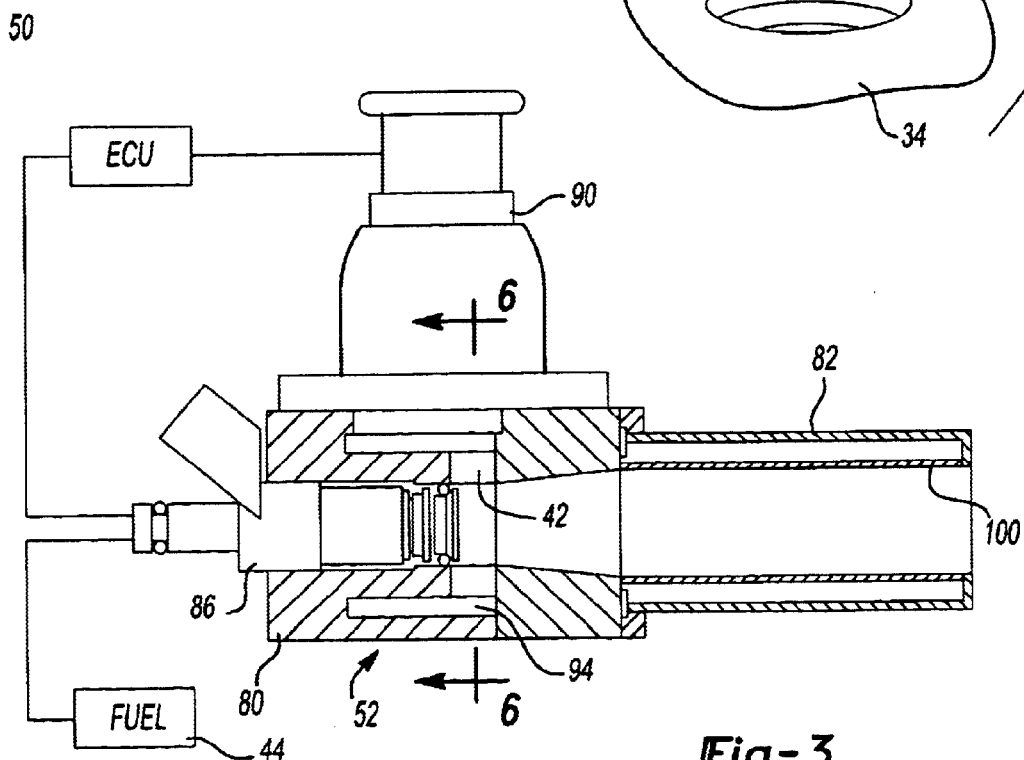
FIG. 3 is a side sectional view illustrating a preferred embodiment of the cold start fuel injector assembly of the present invention.
Figure 6:
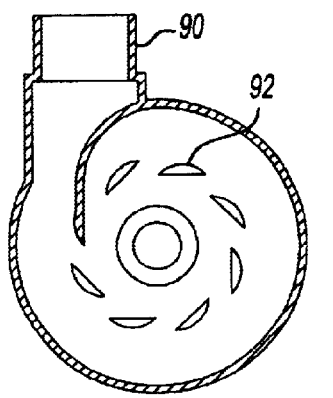
FIG. 6 is a view taken substantially along line 6—6 in FIG. 3.

Referring now to FIGS. 3 and 6, in order to further enhance the atomization of the fuel from the cold start fuel injector 86, a plurality of circumferentially spaced swirl fins 92 are preferably formed in or mounted to the cold start fuel injector body 80 such that these fins 92 are circumferentially disposed around the outlet end of the cold start fuel injector 86. An annular air inlet chamber 94 is fluidly disposed in series between the fins 92 and the air inlet valve 90 so that air inducted through the valve 90 passes through the fins 92 and, in doing so, the fins 92 impart a swirl to the inducted airflow. The swirling air further enhances the atomization of the fuel from the cold start fuel injector 86.

Referring again to FIG. 3, in order to further enhance the vaporization of the fuel from the cold start fuel injector assembly 52 prior to its induction into the auxiliary intake manifold 54, an electrical heater 100 is disposed within the outlet tube 86. The ECU also controls activation of the heater 100. Thus, during a cold start engine condition, the heater is activated so that fuel droplets from the cold start fuel injector 86 impinge upon the heater 82 which then vaporizes the fuel.

Figure 7:
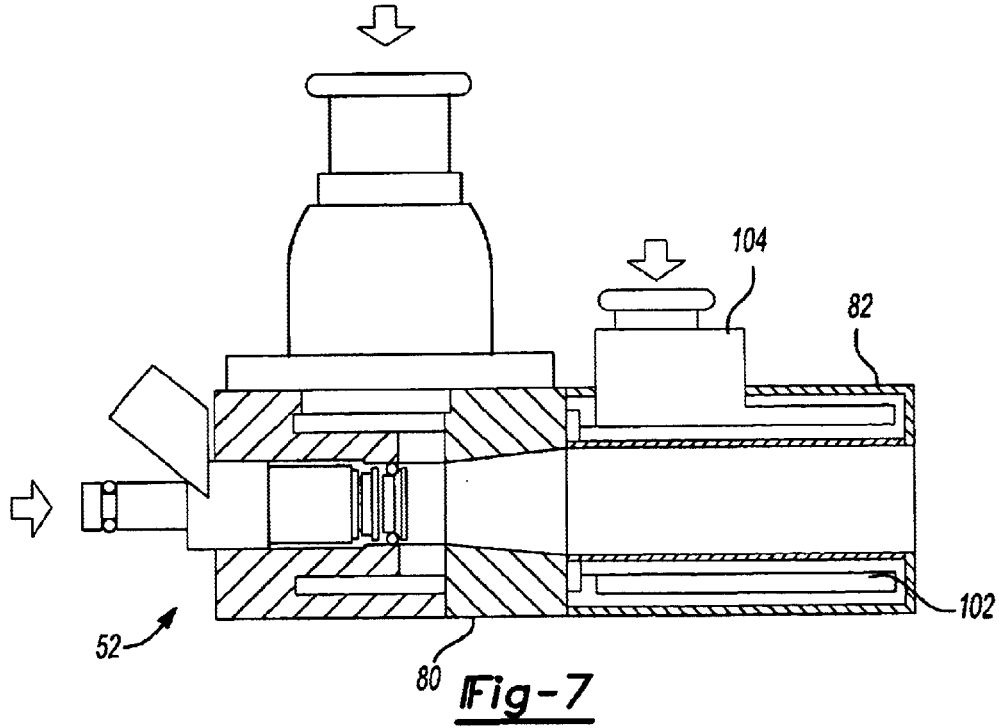
FIG. 7 is a view similar to FIG. 3 but illustrating a further preferred embodiment of the present invention.

With reference now to FIG. 7, in order to provide additional heating to the outlet tube 82 of the cold start fuel injector assembly 52, a tubular and cylindrical chamber 102 is provided within the outlet tube 82. This chamber 102 is fluidly connected to the engine coolant system through a coolant duct 104 so that coolant from the engine coolant system flows into and fills the chamber 102. Such additional heating of the outlet tube 82 is particularly effective where the engine is restarted a relatively short period of time following a previous shutdown of a warm engine condition.

Figure 8:
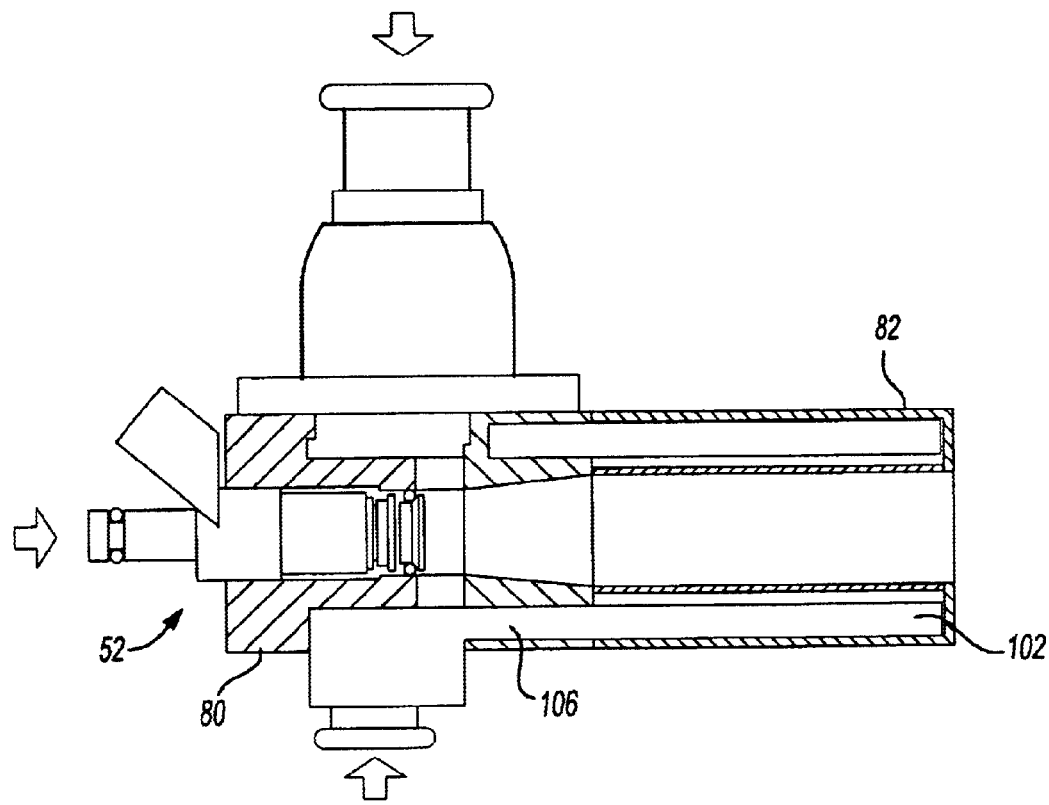
FIG. 8 is a view similar to FIG. 7 but illustrating a still further embodiment of the present invention.

A modification of the cold start fuel injector assembly 52 is illustrated in FIG. 8 in which, in addition to the coolant chamber 102 surrounding the outlet tube 84, engine coolant chamber 106 is also provided within the body 80 of the cold start fuel injector assembly 52. The coolant flow through the body chamber 106 as well as the chamber 102 surrounding the outlet tube 82 results in additional heating of the fuel injector body 80 thereby further enhancing vaporization of the fuel in the fuel/air mixture from the cold start fuel injector assembly 52.

Figure 9:
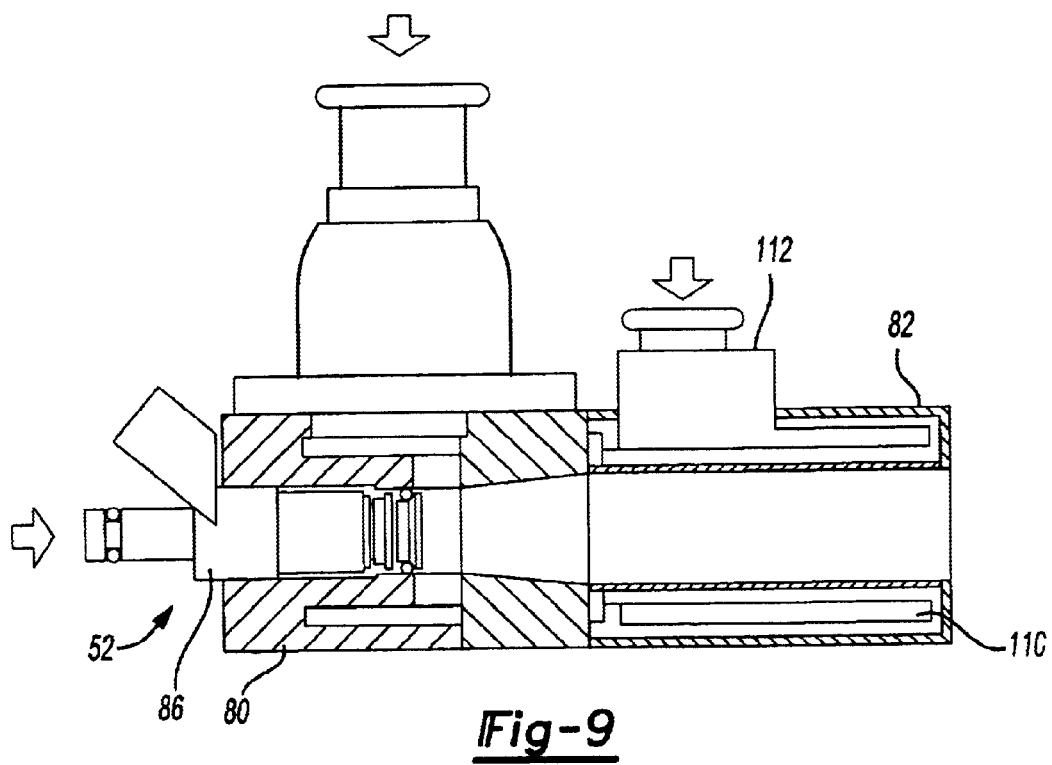
FIG. 9 is a view similar to FIG. 7 but illustrating a further preferred embodiment of the present invention.

With reference now to FIG. 9, a still further embodiment of the cold start fuel injector assembly 52 is shown in which, like the embodiment of the invention illustrated in FIG. 7, a tubular and cylindrical chamber 110 is provided around the outlet tube 82. This outlet chamber 82 is fluidly connected to the exhaust gas from the internal combustion engine through an EGR inlet valve 112. Thus, upon engine start, a portion of the hot exhaust gasses is communicated to the chamber 110 thus heating the outlet tube 82 and enhancing the vaporization of the fuel from the cold start fuel injector 86.

Figure 10:
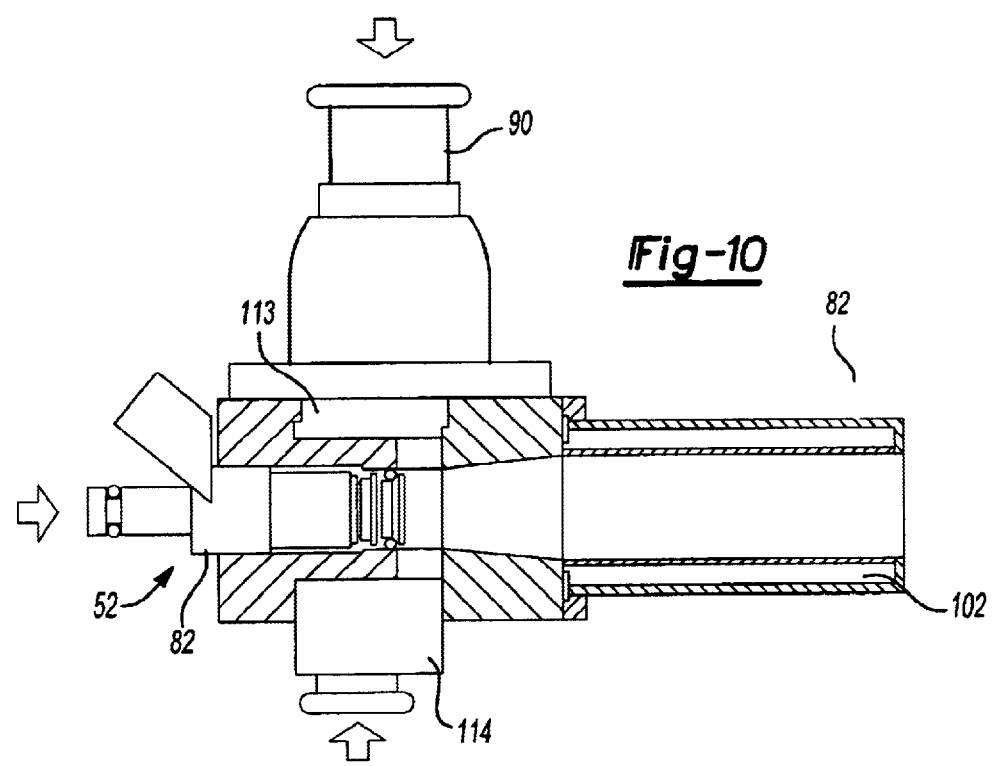
FIG. 10 is a view similar to FIG. 7 but illustrating a further preferred embodiment of the present invention.

With reference now to FIG. 10, a still further preferred embodiment of the cold start fuel injector assembly 52 is shown in which a heating passageway 113 is provided in the cold start fuel injector body 80 such that the passageway 113 is thermally coupled to the air inflow to the cold start fuel injector assembly 82 from the air inlet valve 90. A portion of the exhaust gases from the engine are fluidly communicated to the chamber 113 through an EGR inlet valve 114 such that the engine exhaust gases preheat the inlet air prior to intermixing of the inlet air with the fuel from the cold start fuel injector 86. The relatively warm inlet air, i.e. inducted the air after heating by the engine exhaust gases, further enhances the vaporization of the fuel into the air from the cold start fuel injector assembly 52.

Figure 11:
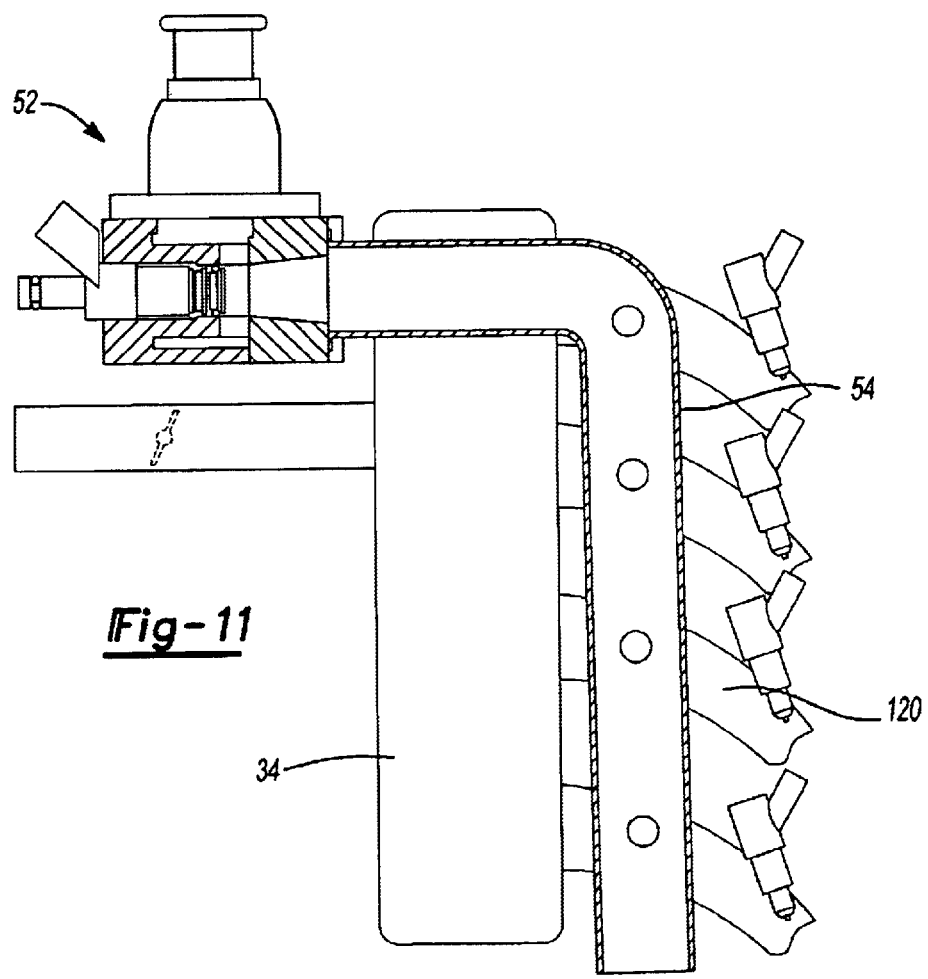
FIG. 11 is a diagrammatic view illustrating a still further preferred embodiment of the present invention.

With reference now to FIG. 11, in order to further enhance the vaporization of the fuel during a cold start engine condition and to also minimize the possibility of fuel condensation or pooling within the auxiliary intake manifold 54, a heater assembly 120 is optionally disposed around at least a portion of the auxiliary intake manifold 54. This heater assembly 120 may comprise an electric heater disposed around the auxiliary intake manifold 54. Optionally, the heater assembly 120 can comprise a fluid passageway disposed around the auxiliary intake manifold 54 which is fluidly connected to either a portion of the exhaust gases from the engine or coolant from the engine coolant system.

Figure 12:
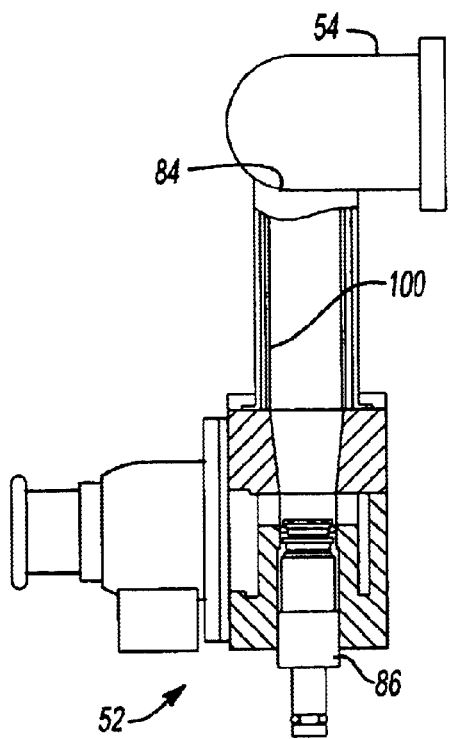
FIG. 12 is a diagrammatic view illustrating a still further preferred embodiment of the present invention.

With reference now to FIG. 12, in order to further enhance the vaporization of the fuel from the cold start fuel injector assembly 52, the outlet tube 82 includes an internal heater 100 (see FIG. 3) to enhance the vaporization of the fuel. Additionally, however, the cold start fuel injector assembly 52 is oriented such that the outlet tube 82 extends in a generally vertical direction with the cold start fuel injector 86 mounted at the bottom of the tube while the outlet end 84 of the tube is connected to the auxiliary intake manifold 54. In operation, any unatomized fuel droplets from the cold start fuel injector 86 will return by gravity to the heater 100 for further vaporization.

Figure 13:
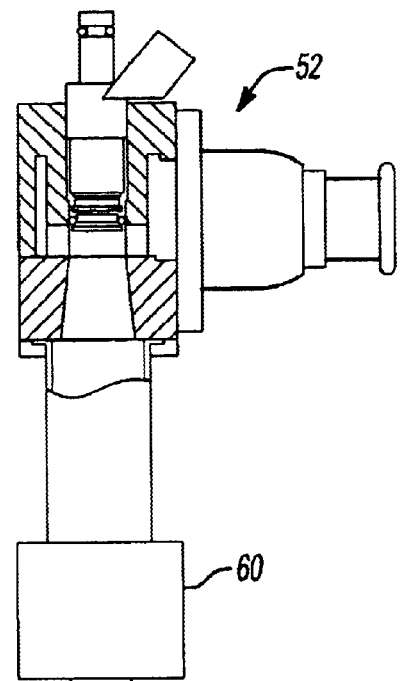
FIG. 13 is a top diagrammatic view illustrating a preferred embodiment of the present invention.
Figure 13:
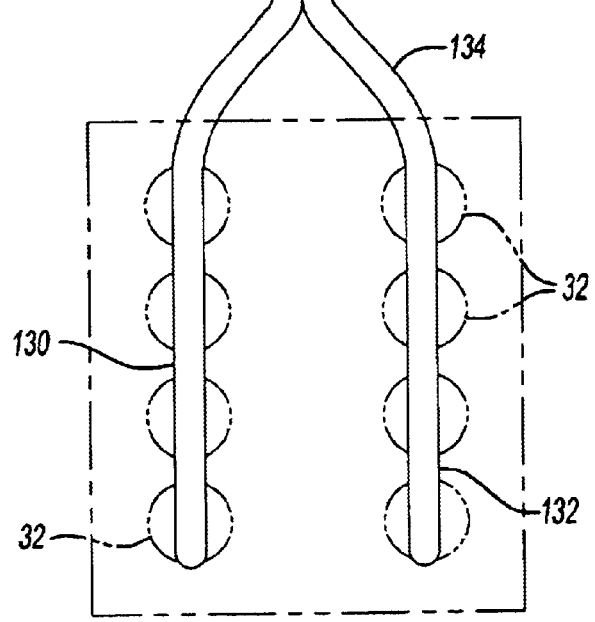

With reference now to FIG. 13, an exemplary engine 30 is there shown having two spaced apart and parallel banks of four cylinders, and thus four combustion chambers, each. In order to provide fuel to each of the engine combustion chambers 32 during a cold start engine condition, the auxiliary intake manifold 54 includes two elongated tubular sections 130 and 132 such that one tubular section 130 extends along one bank of engine combustion chambers 32 while, similarly, the other linear section 132 extends along the other bank of combustion chambers 32. The cold start fuel injector assembly 52 then has fuel/air mixture outlet 60 fluidly connected to both linear sections 130 and 132 through a Y fluid connector 134. The Y fluid connector 134 thus ensures a supply of the fuel/air mixture to both banks of internal combustion chambers 32.

Figure 14:
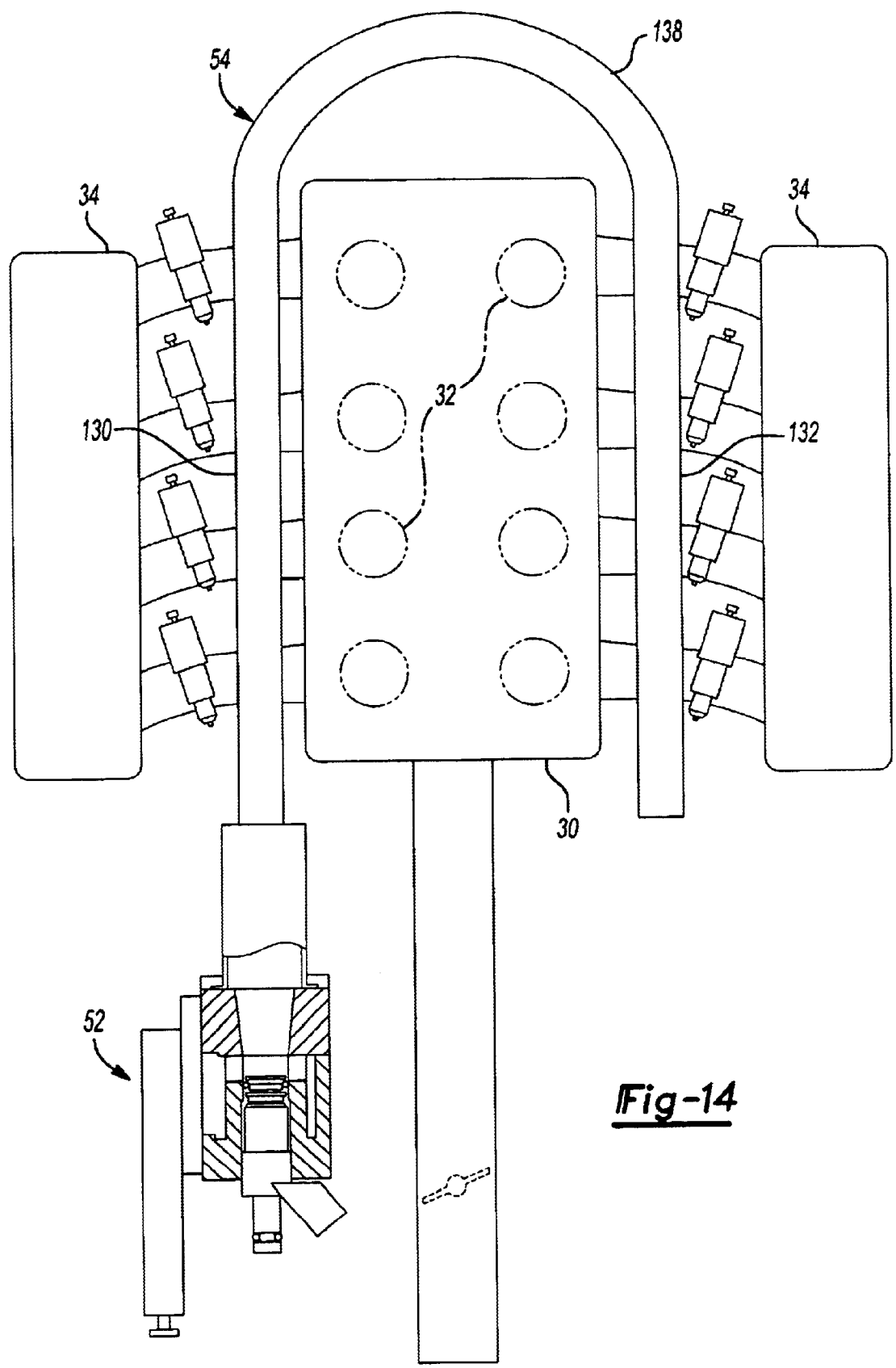
FIG. 14 is a view similar to FIG. 13, but illustrating a still further preferred embodiment of the present invention.

With reference now to FIG. 14, like the embodiment illustrated in FIG. 12, the engine 30 includes two spaced apart but parallel banks of engine combustion chambers 32. The auxiliary intake manifold 54 also includes two linear sections 130 and 132 with one linear section 130 positioned along one bank of cylinders and the other linear section 132 positioned along the other bank of engine combustion chambers 32. Unlike the embodiment illustrated in FIG. 13, however, the cold start fuel injector assembly 52 is fluidly connected to one end 134 of the section 130 while the opposite end 136 of the section 130 is fluidly connected by a connecting tube 138 to the other section 132.

Figure 15:
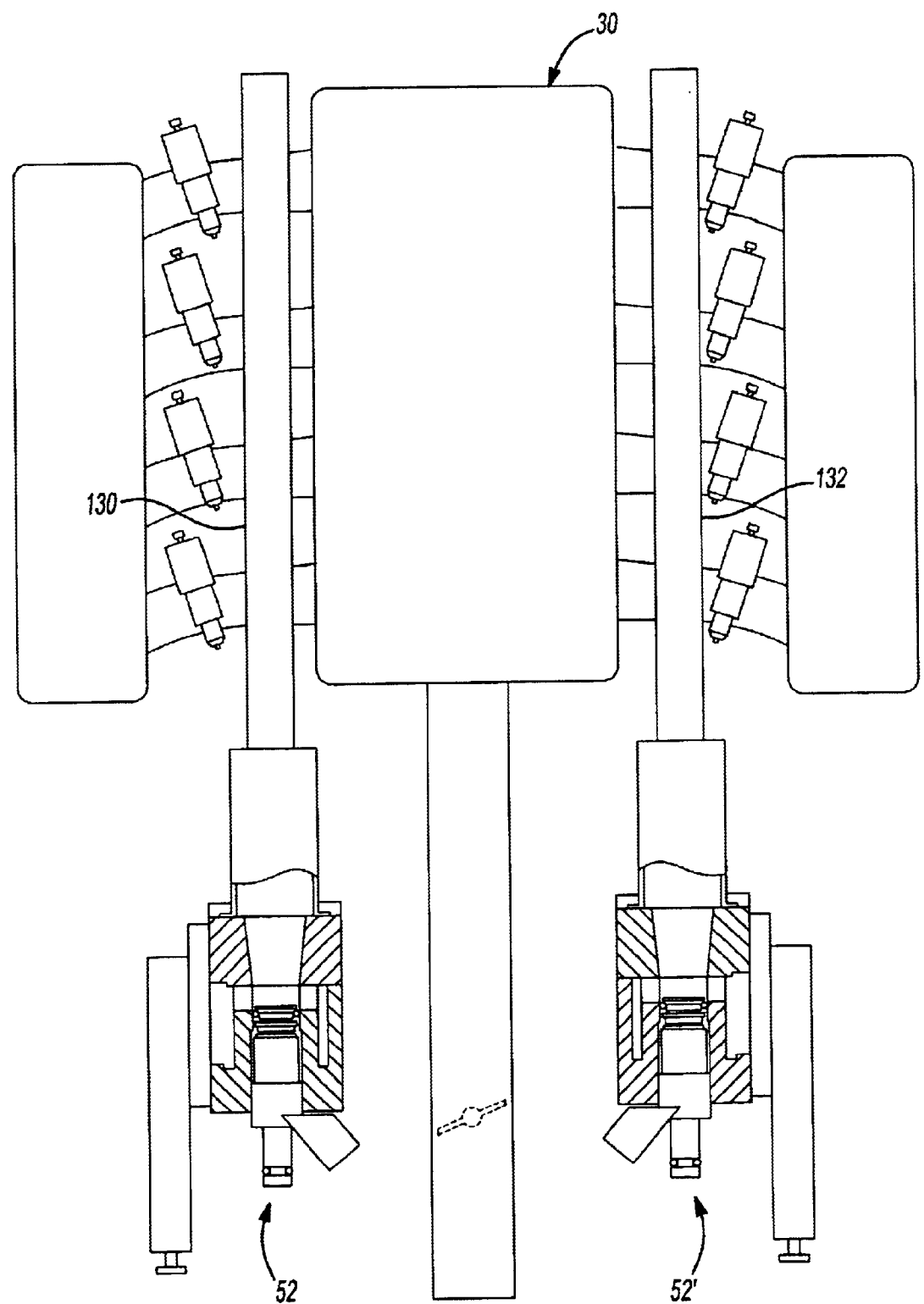
FIG. 15 is a view similar to FIG. 13 but illustrating still a further preferred embodiment of the present invention.

With reference now to FIG. 15, a still further embodiment of the present invention is there shown for use with an engine 30 having two engine banks which are spaced apart and parallel to each other. As in the embodiments illustrated in FIGS. 12 and 13, the auxiliary intake manifold includes a first elongated tubular section 130 extending along one bank of cylinders and, likewise, a second elongated tubular and cylindrical section 132 extending along the other bank of engine cylinders. Unlike the embodiments illustrated in FIGS. 12 and 13, however, one cold start fuel injector assembly 52 is associated with the section 130 while a second cold start fuel injector assembly 52' is fluidly connected to the other section 132. Since the fuel injectors 52 and 52' in FIG. 14 each provide only substantially one-half the fuel to the engine as the single cold start fuel injector assembly 52 shown in FIGS. 12 and 13, a smaller construction of the cold start fuel injector assembly 52 may be used and/or better control of the fuel/air mixture to the engine may be obtained.

In operation, during a cold start engine condition, the ECU 50 controls activation of the cold start fuel injector 86 and its air supply valve 90 (FIG. 3) to provide atomized fuel to the engine internal combustion chamber 32 via the auxiliary intake manifold 54. The ECU 50 also controls activation of any and all heaters or heating mechanisms employed with the cold start fuel injector assembly 52 and/or the auxiliary intake manifold 54 to ensure vaporization of the fuel prior to its induction into the internal combustion chambers.

During a cold start engine operating condition, the ECU 50 typically deactivates the multipoint fuel injectors so that the cold start fuel assembly 52 provides all of the fuel to the engine during the cold start engine condition. However, as the engine warms, the ECU 50 decreases the amount of fuel provided by the cold start fuel assembly 52 while simultaneously increasing the amount of fuel provided by the multipoint fuel injectors to achieve a smooth transition from a cold and to a warm engine operating condition.

A primary advantage of the cold start fuel control system of the present invention is that, since the auxiliary intake manifold 54 has a much smaller internal volume than the primary intake manifold, quicker engine starting can be achieved as well as a decreased likelihood of fuel condensation within the auxiliary intake manifold. This, in turn, results in more efficient engine operation and reduced engine emissions.

Having described my invention, however, many modifications thereto will become apparent to those skilled in the art to which it pertains without deviation from the spirit of the invention as defined by the scope of the appended claims.

We claim:

1. A cold start fuel control system for use with an internal combustion engine having at least one combustion chamber, a source of fuel, and a primary intake manifold having an air inlet and an outlet port connected to each of the at least one combustion chamber, said system comprising:

a cold start fuel assembly having an inlet and an outlet, said cold start fuel assembly inlet being fluidly connected to the source of fuel, an auxiliary intake manifold having an internal chamber, said cold start fuel assembly outlet being fluidly connected to said auxiliary intake manifold chamber, said auxiliary intake manifold chamber being fluidly connected through a branch pipe to the at least one combustion chamber at a position downstream from the inlet of the primary intake manifold, a control orifice member selected to deliver a predetermined fuel flow fluidly connected in series between said branch pipe of said auxiliary intake manifold and each of the at least one combustion chamber.

2. The invention as defined in claim 1 wherein the volume of said auxiliary intake manifold chamber is less than a volume of the primary intake manifold.

3. The invention as defined in claim 1 wherein said auxiliary intake manifold chamber is fluidly connected to the at least one internal combustion chamber closely adjacent the outlet of the primary intake manifold.

4. The invention as defined in claim 1 wherein said auxiliary intake manifold comprises an elongated tube having an inlet end fluidly connected to the outlet of said cold start fuel assembly, said tube being secured to the engine such that said tube slopes downwardly from said inlet end of said tube.

5. The invention as defined in claim 1 wherein said auxiliary intake manifold and the primary intake manifold are of a one piece construction.

6. The invention as defined in claim 1 wherein said cold start fuel assembly comprises a body, an outlet tube and a fuel injector mounted to said body so that said fuel injector, upon activation, discharges fuel into said outlet tube.

7. The invention as defined in claim 6 and comprising means for heating said outlet tube.

8. The invention as defined in claim 7 wherein said heating means comprises an electrical heater thermally connected to said outlet tube.

9. The invention as defined in claim 7 wherein said fuel injector outlet tube includes at least one fluid passageway surrounding at least a portion of said outlet tube and wherein said heating means comprises a fluid conduit for fluidly connecting exhaust gases from the internal combustion engine to said fluid passageway.

10. The invention as defined in claim 9 wherein said fuel injector body includes at least one fluid body passageway surrounding at least a portion of said fuel injector body and wherein said heating means comprises a fluid conduit for fluidly connecting exhaust gases from the internal combustion engine to said fluid body passageway.

11. The invention as defined in claim 7 wherein said fuel injector outlet tube includes at least one fluid passageway surrounding at least a portion of said outlet tube and wherein said heating means comprises a fluid conduit for fluidly connecting engine coolant from the internal combustion engine to said fluid passageway.

12. The invention as defined in claim 11 wherein said fuel injector body includes at least one fluid body passageway surrounding at least a portion of said fuel injector body and wherein said heating means comprises a fluid conduit for fluidly connecting engine coolant from the internal combustion engine to said fluid body passageway.

13. The invention as defined in claim 1 and comprising means for heating said auxiliary intake manifold.

14. The invention as defined in claim 13 wherein said heating means comprises an electrical heater thermally connected to said auxiliary intake manifold.

15. The invention as defined in claim 13 wherein said auxiliary intake manifold includes at least one fluid passageway surrounding at least a portion of said auxiliary intake manifold and wherein said heating means comprises a fluid conduit for fluidly connecting engine coolant from the internal combustion engine to said fluid passageway.

16. The invention as defined in claim 13 wherein said auxiliary intake manifold includes at least one fluid passageway surrounding at least a portion of said auxiliary intake manifold and wherein said heating means comprises a fluid conduit for fluidly connecting exhaust gases from the internal combustion engine to said fluid passageway.

17. The invention as defined in claim 6 and comprising a plurality of swirl vanes mounted in said fuel injector body between said fuel injector and said outlet tube.

18. The invention as defined in claim 7 wherein said fuel injector outlet tube has an axis disposed generally vertically and wherein said fuel injector is positioned at a bottom of said outlet tube.

19. A cold start fuel control system for use with an internal combustion engine having a plurality of combustion chambers arranged in at least two spaced apart and parallel banks, a source of fuel and a primary intake manifold having an air inlet and a plurality of outlet ports with one outlet port being fluidly connected to each combustion chamber, said system comprising:

a cold start fuel assembly having an inlet and an outlet, said cold start fuel assembly inlet being fluidly connected to the source of fuel, an auxiliary intake manifold having an internal chamber, said cold start fuel assembly outlet being fluidly connected to said auxiliary intake manifold chamber, said auxiliary intake manifold chamber being fluidly connected through a branch pipe to each combustion chamber at a position downstream from the inlet of the primary intake manifold, a control orifice member selected to deliver a predetermined fuel flow fluidly connected in series between said branch pipe of said auxiliary intake manifold and each of said combustion chambers.

20. The invention as defined in claim 19 wherein said auxiliary intake manifold comprises a first linear section extending along one bank of combustion chambers, a second linear section extending along the other bank of combustion chambers and a third section which connects said first and second sections together.

21. The invention as defined in claim 20 wherein said third section of said auxiliary intake manifold is substantially Y-shaped with the outlet from the cold start fuel injector assembly fluidly connected to the base of the Y-shaped section and one end of both the first and second sections being connected to the ends of the Y-shaped section.

22. The invention as defined in claim 20 wherein said third section of said auxiliary intake manifold fluidly connects one end of said first section to one end of said second section and wherein said outlet of said cold start fuel injector assembly is fluidly connected to the other end of one of said first and second sections of said auxiliary intake manifold.

23. A cold start fuel control system for use with an internal combustion engine having a plurality of combustion chambers arranged in at least two spaced apart and parallel banks, a source of fuel and a primary intake manifold having an air inlet and a plurality of outlet ports with one outlet port being fluidly connected to each combustion chamber, said system comprising:

a first cold start fuel injector assembly having an inlet and an outlet, a first elongated auxiliary intake manifold having an internal chamber and secured to the engine so that said first auxiliary intake manifold extends along one bank of combustion chambers, said first auxiliary intake manifold chamber being fluidly connected to each combustion chamber in its associated bank at a position downstream from the inlet of the primary intake manifold, said outlet from said first cold start injector assembly being fluidly connected with said internal chamber of said first auxiliary intake manifold, said first cold start fuel injector assembly inlet being fluidly connected to the source of fuel, a second cold start fuel injector assembly having an inlet and an outlet, a second elongated auxiliary intake manifold having an internal chamber and secured to the engine so that said first auxiliary intake manifold extends along the other bank of combustion chambers, said second auxiliary intake manifold chamber being fluidly connected to each combustion chamber in its associated bank at a position downstream from the inlet of the primary intake manifold, said outlet from said second cold start injector assembly being fluidly connected with said internal chamber of said second auxiliary intake manifold, said first cold start fuel injector assembly inlet being fluidly connected to the source of fuel.

24. A cold start fuel control system for use with an internal combustion engine having at least one combustion chamber, a source of fuel, and a primary intake manifold having an air inlet and an outlet port connected to each of the at least one combustion chamber, said system comprising:

a cold start fuel assembly having an inlet and an outlet, said cold start fuel assembly inlet being fluidly connected to the source of fuel, an auxiliary intake manifold having an internal chamber, said cold start fuel assembly outlet being fluidly connected to said auxiliary intake manifold chamber, said auxiliary intake manifold chamber being fluidly connected to the at least one combustion chamber at a position downstream from the inlet of the primary intake manifold, wherein said auxiliary intake manifold comprises an elongated tube having an inlet end fluidly connected to the outlet of said cold start fuel assembly, said tube being secured to the engine such that said tube slopes continuously downwardly from said inlet end of said tube and toward the primary intake manifold.

25. The invention as defined in claim 24 wherein the volume of said auxiliary intake manifold chamber is less than a volume of the primary intake manifold.

26. The invention as defined in claim 24 wherein said auxiliary intake manifold chamber is fluidly connected to the at least one internal combustion chamber closely adjacent the outlet of the primary intake manifold.

27. The invention as defined in claim 24 wherein said auxiliary intake manifold comprises an elongated tube having an inlet end fluidly connected to the outlet of said cold start fuel assembly, said tube being secured to the engine such that said tube slopes downwardly from said inlet end of said tube.

28. The invention as defined in claim 24 wherein said auxiliary intake manifold and the primary intake manifold are of a one piece construction.

29. The invention as defined in claim 24 and comprising a control orifice fluidly connected in series between said auxiliary intake manifold chamber and each of the at least one combustion chamber.

30. The invention as defined in claim 24 wherein said cold start fuel assembly comprises a body, an outlet tube and a fuel injector mounted to said body so that said fuel injector, upon activation, discharges fuel into said outlet tube.

31. The invention as defined in claim 30 and comprising means for heating said outlet tube.

* * * * *